United States Patent
Cai et al.

(10) Patent No.: US 11,493,682 B2
(45) Date of Patent: Nov. 8, 2022

(54) DISPLAY DEVICE AND BACKLIGHT MODULE

(71) Applicants: Beijing BOE Optoelectronics Technology Co., Ltd., Beijing (CN); BOE Technology Group Co., Ltd., Beijing (CN)

(72) Inventors: Xiujun Cai, Beijing (CN); Cuie Wang, Beijing (CN); Wenli Lan, Beijing (CN); Sa Li, Beijing (CN); Dong Wang, Beijing (CN); Dawei Wang, Beijing (CN)

(73) Assignees: Beijing BOE Optoelectronics Technology Co., Ltd., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/518,233

(22) Filed: Nov. 3, 2021

(65) Prior Publication Data

US 2022/0146747 A1 May 12, 2022

(30) Foreign Application Priority Data

Nov. 10, 2020 (CN) .......................... 202011244149.6

(51) Int. Cl.
*F21V 8/00* (2006.01)
*G02F 1/1335* (2006.01)

(52) U.S. Cl.
CPC .......... *G02B 6/0088* (2013.01); *G02B 6/0031* (2013.01); *G02B 6/0051* (2013.01); *G02B 6/0093* (2013.01); *G02F 1/133512* (2013.01); *G02F 1/133514* (2013.01)

(58) Field of Classification Search
CPC ............ G02F 1/133615; G02B 6/0051; G02B 6/0053

See application file for complete search history.

(56) References Cited

U.S. PATENT DOCUMENTS

| | | | | |
|---|---|---|---|---|
| 8,403,548 | B2* | 3/2013 | Kim | G02B 6/0021 362/621 |
| 9,036,111 | B2* | 5/2015 | Choi | G02B 6/0091 349/60 |
| 10,488,704 | B2* | 11/2019 | Yuki | G02B 6/426 |
| 2009/0002598 | A1* | 1/2009 | Choo | G02B 6/0091 362/616 |
| 2012/0002441 | A1* | 1/2012 | Yabe | G02F 1/133615 362/607 |
| 2013/0044511 | A1* | 2/2013 | Motooka | G02B 6/0051 362/606 |
| 2019/0373715 | A1* | 12/2019 | Liu | H05K 1/0259 |

* cited by examiner

*Primary Examiner* — Eric T Eide
(74) *Attorney, Agent, or Firm* — IPro, PLLC

(57) ABSTRACT

Disclosed are a display device and a backlight module. The display device includes a backlight module, a liquid crystal display panel, and a chip-on-flex. The backlight module may include a frame body, and an edge-type light source, a light guide plate, a reflector strip, a light absorber strip, and an optical film disposed in the frame body. The light absorber strip and the diffuser sheet are not bonded, and the reflector strip and the diffuser sheet of the optical film are bonded.

18 Claims, 3 Drawing Sheets

DISPLAY DEVICE AND BACKLIGHT MODULE

CROSS-REFERENCE TO RELATED APPLICATION

This application claims the priority to the Chinese Patent Application No. 202011244149.6, filed on Nov. 10, 2020, and entitled "DISPLAY DEVICE AND BACKLIGHT MODULE," the disclosure of which is herein incorporated by reference in its entirety.

TECHNICAL FIELD

The present disclosure relates to the field of display technologies, and in particular relates to a display device and a backlight module.

BACKGROUND

A liquid crystal display device usually includes: a liquid crystal display panel, a backlight module arranged on a backlight surface of the liquid crystal display panel (that is, a surface distal from a light emitting surface), and a driving chip for driving the liquid crystal display panel to operate. In order to reduce a frame size of the liquid crystal display device, the driving chip of the liquid crystal display device is usually packaged by a chip-on-flex (COF) packaging technology. In the case that the driving chip is packaged by the chip-on-flex technology, one end of the chip-on-flex is electrically connected to the liquid crystal display panel, and the rest portions of the chip-on-flex need to be bent to a side, distal from the liquid crystal display panel, of the backlight module, and bonded to the side, distal from the liquid crystal display panel, of the backlight module.

SUMMARY

Embodiments of the present disclosure provide a display device and a backlight module According to one aspect of the embodiments of the present disclosure, a display device is provided. The display device includes a chip-on-flex, a liquid crystal display panel and a backlight module.

The chip-on-flex is electrically connected to the liquid crystal display panel, and connected to a side, distal from the liquid crystal display panel, of the backlight module.

The backlight module includes a frame body, and an edge-type light source, a light guide plate, a reflector strip, a light absorber strip, and an optical film disposed in the frame body.

A light emitting surface of the light source faces a side surface of the light guide plate, and the optical film is disposed on the light guide plate.

The reflector strip is disposed on a side, proximal to the light source, of the frame body, between the optical film and the light guide plate, and connected to the optical film.

The light absorber strip is disposed on an inner side, proximal to the light source, of the frame body, disposed on a side, distal from the reflector strip, of the optical film, and arranged separately from the optical film.

In some embodiments, a surface, proximal to the light guide plate, of the reflector strip is arranged separately from the light guide plate.

In some embodiments, an inner side, proximal to the light source, of the frame body is provided with a slot, and a surface, distal from the light guide plate, of the reflector strip is connected to a side wall of the slot.

In some embodiments, a surface, distal from the light guide plate, of the reflector strip is provided with an adhesive layer, and the adhesive layer is bonded to the optical film and the side wall of the slot.

In some embodiments, the adhesive layer is a single-sided adhesive tape, and the reflector strip is a white adhesive strip with the single-sided adhesive tape.

In some embodiments, the adhesive layer is a double-sided adhesive tape, the reflector strip is a strip-shaped metal reflection structure, and the metal reflection structure is bonded to one surface of the double-sided adhesive tape.

In some embodiments, the frame body further is provided with a back plate, and the back plate is configured to support the light guide plate.

In some embodiments, the backlight module further includes a reflector sheet disposed between the light guide plate and the back plate.

In some embodiments, the optical film includes a diffuser sheet disposed on the light guide plate, the reflector strip is disposed between the diffuser sheet and the light guide plate, and the optical film further includes a two-layer light-enhancement sheet disposed on a side, distal from the light guide plate, of the diffuser sheet.

In some embodiments, a side, proximal to the light source, of the diffuser sheet is provided with a strip-shaped light absorption structure, and the light absorption structure is in contact with the reflector strip.

In some embodiments, a width of the light absorption structure is greater than a width of a contact area between the diffuser sheet and the reflector strip.

In some embodiments, the light absorption structure is further in contact with the light guide plate.

In some embodiments, the light absorption structure is silk-screened black oil.

In some embodiments, the backlight module further includes a light-shielding adhesive disposed between the frame body and the liquid crystal display panel, one surface of the light-shielding adhesive is bonded to the liquid crystal display panel, and the other surface of the light-shielding adhesive is bonded to the light absorber strip.

In some embodiments, the surface, distal from the display panel, of the light-shielding adhesive is further bonded to an end surface, proximal to the liquid crystal display panel, of the frame body.

In some embodiments, the light absorber strip is a black adhesive strip.

In some embodiments, the display panel includes an array substrate and a color filter substrate arranged oppositely from each other, a first polarizer disposed on a side, distal from the color filter substrate, of the array substrate, and a second polarizer disposed on a side, distal from the array substrate, of the color filter substrate; a surface, proximal to the display panel, of the light-shielding adhesive is bonded to the first polarizer.

In some embodiments, the backlight module further includes a buffer foam disposed between the light-shielding adhesive and the array substrate, and a surface, proximal to the array substrate, of the buffer foam is provided with a double-sided adhesive tape.

One surface of the buffer foam is bonded to the light-shielding adhesive, and the other surface of the buffer foam is bonded to the array substrate by the double-sided adhesive tape.

In some embodiments, the light source includes a flexible circuit board, and a plurality of lamp bodies disposed on the flexible circuit board. A light emitting surface of each of the plurality of lamp bodies is connected to a side surface of the light guide plate, and the flexible circuit board is connected to a side, distal from the optical film, of the light guide plate.

According to another aspect of the embodiments of the present disclosure, a backlight module is provided. The backlight module includes a frame body, and an edge-type light source, a light guide plate, a reflector strip, a light absorber strip, and an optical film disposed in the frame body.

A light emitting surface of the light source faces a side surface of the light guide plate, and the optical film is disposed on the light guide plate.

The reflector strip is disposed on a side, proximal to the light source, of the frame body, between the optical film and the light guide plate, and connected to the optical film.

The light absorber strip is disposed on a side, proximal to the light source, of the frame body, and a side, distal from the reflector strip, of the optical film, and arranged separately from the optical film.

DETAILED DESCRIPTION

In order to make the purposes, technical solutions, and advantages of the present disclosure clearer, implementations of the present disclosure may be further described in detail hereinafter with reference to the accompanying drawings.

Figure 1:
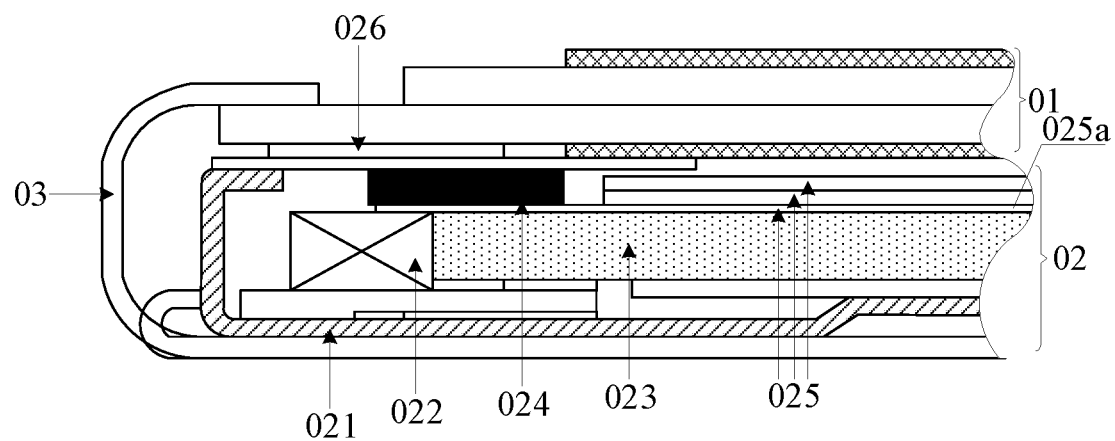
FIG. 1 is a schematic diagram of a film structure of a display device.

Referring to FIG. 1, FIG. 1 is a schematic diagram of a film structure of a display device. The display device may include a liquid crystal display panel 01, a backlight module 02 and a chip-on-flex 03.

The backlight module 02 is usually arranged on a side, distal from the light emitting surface, of the liquid crystal display panel 01.

One end of the chip-on-flex 03 can be electrically connected to the liquid crystal display panel 01, and in the case that the chip-on-flex 03 is electrically connected to the liquid crystal display panel 01, the rest portions of the chip-on-flex 03 can be bent to a side, distal from the liquid crystal display panel 01, of the backlight module 02, and bonded to the side, distal from the liquid crystal display panel 01, of the backlight module 02.

The backlight module 02 of the display device may include a frame body 021, and an edge-type light source 022, a light guide plate 023, a black adhesive strip 024 and a plurality of laminated optical films 025 disposed in the frame body 021, and a light-shielding adhesive strip 026 disposed between the frame body 021 and the liquid crystal display panel 01.

A light emitting surface of the light source 022 faces a side surface of the light guide plate 023.

The plurality of laminated optical films 025 are all disposed on the light guide plate 023, and one optical film that is in contact with the light guide plate 023, of the plurality of laminated is usually a diffuser sheet 025a.

The black adhesive strip 024 may be disposed on a side, proximal to the light source 022, of the frame body 021, and disposed on a surface, distal from the light guide plate 021, of the diffuser sheet 025a. A surface of the black adhesive strip 024 in contact with the diffuser sheet 025a is provided with a single-sided adhesive tape, and the black adhesive strip 024 can be bonded to the diffuser sheet 025a by the single-sided adhesive tape.

The light-shielding adhesive strip 026 is usually a double-sided adhesive tape. One surface of the light-shielding adhesive strip 026 can be bonded to the liquid crystal display panel 01, and the other side of the light-shielding adhesive strip 026 can be bonded to an end surface, proximal to the liquid crystal display panel 01, of the frame body 021, and a surface, distal from the diffuser sheet 025a, of the black adhesive strip 024.

Figure 2:
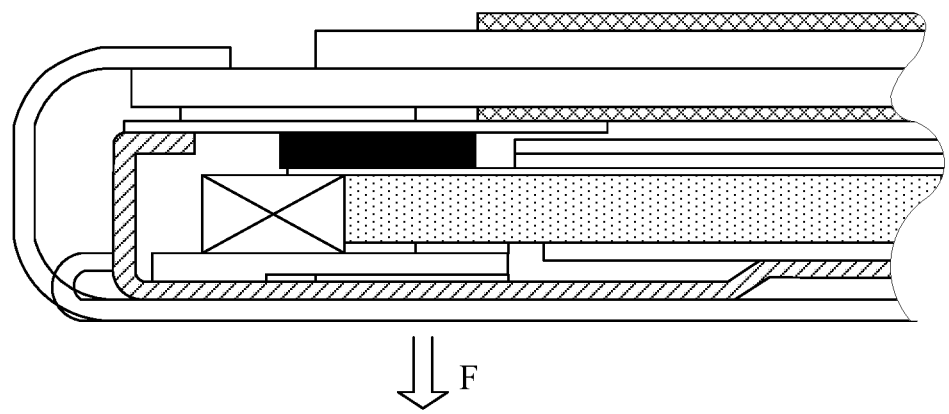
FIG. 2 is a force analysis diagram of the display device shown in FIG. 1.

In the case that the bent chip-on-flex 03 of the display device is bonded to the side, distal from the liquid crystal display panel 01, of the frame body 021 of the backlight module 02, the light source 022 of the backlight module 02 is disposed on a side, proximal to the chip-on-flex 03, of the frame body 021. In this case, referring to FIG. 2, FIG. 2 is a force analysis diagram of the display device shown in FIG. 1. A bent portion of the chip-on-flex 03 has a certain rebound force. Under the action of the rebound force, a portion bonded to the chip-on-flex 03, of the frame body 021 of the backlight module 02 may be subject to a pulling force F from the chip-on-flex 03. Under the action of the pulling force F, the portion of the frame body 021 that is bonded to the chip-on-flex 03 may move along a direction of the pulling force F, resulting in the light source 022 and a portion of the light guide plate 023 on the side proximal to the light source 022 inside the frame body 021 may also follow the displacement of the frame body 021 to move along the direction of the pulling force F. The black adhesive strip 024 and the diffuser sheet 025a are bonded together, the diffuser sheet 025a is in contact with the light guide plate 023 only, and is not bonded to the light guide plate 023, therefore, the black adhesive strip 024 and a portion of the diffuser sheet 025a that is bonded to the black adhesive strip 024 may move along a direction opposite to the pulling force F relative to the light guide plate 023.

In this way, the portion of the light guide plate 023 on the side proximal to the light source 022 and the portion of the diffuser sheet 025a that is bonded to the black adhesive strip 024 are separated from each other, and the light guide plate 023 is not in contact with the diffuser sheet 025a, resulting in a flared opening formed between the light guide plate 023 and the diffuser sheet 025a. Light emitted by the light source 022 may be emitted from an area between the light guide plate 023 and the diffuser sheet 025a. That is, light leakage occurs in the case that the light is emitted by the light source 022 of the backlight module 02, leading to a poor light emission effect of the backlight module 02, which affects a display effect of the display device.

In order to improve the light emission effect of the backlight module 02, commonly used improvement measures are as follows:

(1) The light guide plate 023 of the backlight module 02 is redesigned. An area, proximal to a lamp body of the light source 022, of the light guide plate 023 is provided with denser dots, and an area, proximal to an area between two lamp bodies, of the light guide plate 023 is provided with sparse dots.

(2) A special tool is used for pressure holding treatment in the case of bending the chip-on-flex 03, ensuring that the bent chip-on-flex 03 and the backlight module 01 are fully bonded, so as to reduce a rebound force existing in a bent portion of the chip-on-flex 03.

(3) The chip-on-flex 03 is redesigned to reduce a thickness of the chip-on-flex 03, thereby reducing the rebound force existing in the bent portion of the chip-on-flex 03.

However, none of the above three improvement measures can effectively suppress the light leakage in the case that the light is emitted by the light source 022 of the backlight module 02, and these three improvement measures all involve redesign of structure, thereby leading to a high manufacturing cost.

Figure 3:
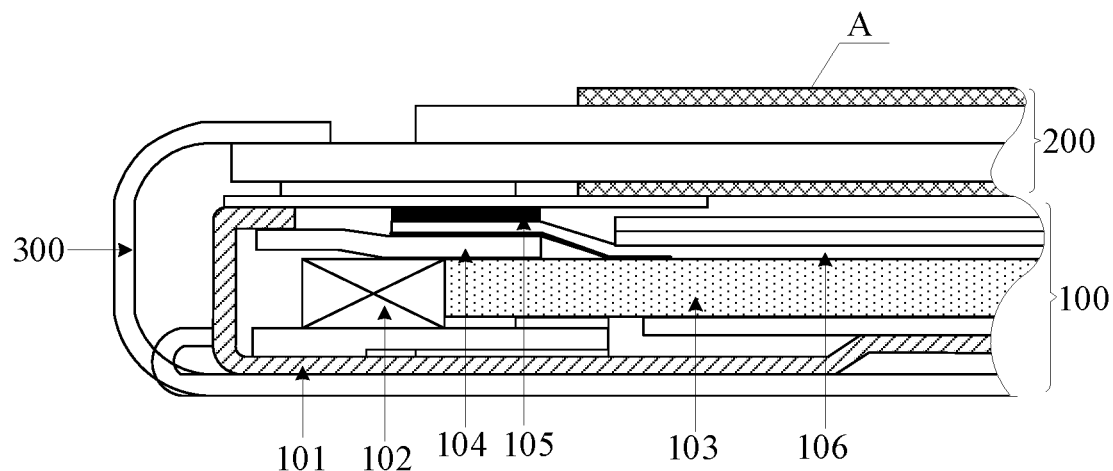
FIG. 3 is a schematic diagram of a film structure of a display device according to an embodiment of the present disclosure.

Referring to FIG. 3. FIG. 3 is a schematic diagram of a film structure of a display device provided according to an embodiment of the present disclosure. The display device may include:

a backlight module 100, a liquid crystal display panel 200, and a chip-on-flex 300. The backlight module 100 is usually arranged on a side, distal from the light emitting surface A, of the liquid crystal display panel 200.

The chip-on-flex 300 is electrically connected to the liquid crystal display panel 200. For example, a non-display area of the liquid crystal display panel 200 is provided with a bonding structure, and one end of the chip-on-flex 300 is provided with a connection structure. One end of the chip-on-flex 300 can be electrically connected to the bonding structure of the liquid crystal display panel 200 by the connection structure. In this way, electrical connection between the chip-on-flex 300 and the liquid crystal display panel 200 can be realized. In a possible implementation, the bonding structure of the liquid crystal display panel 200 and the connection structure of the chip-on-flex 300 may be bonded by an anisotropic conductive film (ACF). An electrical connection between the liquid crystal display panel 200 and the chip-on-flex 300 can be realized, and a firm connection between the liquid crystal display panel 200 and the chip-on-flex 300 can be ensured by the anisotropic conductive film. In the present disclosure, the display device may further include: a driving chip (not shown in FIG. 3) configured to control the liquid crystal display panel 100 to display an image, and the driving chip may be packaged by the chip-on-flex 300 of the display device. The chip-on-flex 300 may be electrically connected to the liquid crystal display panel 100, thus the driving chip of the display device can be electrically connected to the liquid crystal display panel 100 by the chip-on-flex 300 to realize control of content displayed by the screen of liquid crystal display panel 200.

The chip-on-flex 300 can further be connected to a side, distal from the liquid crystal display panel 200, of the backlight module 100. For example, in the case that the chip-on-flex 300 is electrically connected to the liquid crystal display panel 200, the chip-on-flex 300 may be bent. In this way, the bent chip-on-flex 300 can be bonded to the side, distal from the liquid crystal display panel 200, of the backlight module 100 by a double-sided adhesive tape. In the present disclosure, in the case that the chip-on-flex 300 is bonded to the side, distal from the liquid crystal display panel 200, of the backlight module 100, the driving chip packaged by the chip-on-flex 300 is disposed on the side, distal from the liquid crystal display panel 200, of the backlight module 100. In this way, a frame of the display device does not need to shield the driving chip, and thus a width of the frame of the display device can be reduced, so that a screen-to-body ratio of the display device can be improved.

In the embodiments of the present disclosure, the backlight module of the display device may include a frame body 101, and an edge-type light source 102, a light guide plate 103, a reflector strip 104, a light absorber strip 105, and an optical film (not marked in FIG. 3) disposed in the frame body.

A light emitting surface of the light source 102 may face a side surface of the light guide plate 103. In the present disclosure, a light emitted by the light source 102 can be homogenized by the light guide plate 103, and then exit from a side, proximal to the liquid crystal display panel 200, of the light guide plate 103.

The optical film is disposed on the light guide plate 103.

The reflector strip 104 may be disposed on an inner side, proximal to the light source 102, of the frame body 101, and the reflector strip 104 may be disposed between the optical film and the light guide plate 103. The reflector strip 104 may be connected to the optical film. In the present disclosure, a length direction of the reflector strip 104 may be parallel to a length direction of the edge-type light source 102.

The light absorber strip 105 may be disposed on a side, proximal to the light source 102, of the frame body 101, and disposed on a side, distal from the reflector strip 104, of the optical film. The light absorber strip 105 is arranged separately from the optical film. That is, the light absorber strip 105 and the optical film are not bonded. In the present disclosure, a length direction of the light absorber strip 105 may be parallel to the length direction of the edge-type light source 102.

For example, the optical film may include a diffuser sheet 106 disposed on the light guide plate 103, and in a possible implementation, the diffuser sheet 106 may be in contact with the light guide plate 103. The reflector strip 104 can be disposed between the diffuser sheet 106 of the optical film and the light guide plate 103, and the reflector strip 104 and the diffuser sheet 106 can be connected by bonding. The light absorber strip 105 may be disposed on a side, distal from the reflector strip 104, of the diffuser sheet 106 of the optical film, and the light absorber strip 105 and the diffuser sheet 106 are separately arranged from each other.

In the embodiments of the present disclosure, in the case that the chip-on-flex 300 of the display device is bent, the chip-on-flex 300 can be bonded to the side, distal from the liquid crystal display panel 200, of the frame body 101 of the backlight module 100, the light source 102 of the backlight module 100 is disposed on a side, proximal to the chip-on-flex 300, of the frame body 101.

Figure 4:
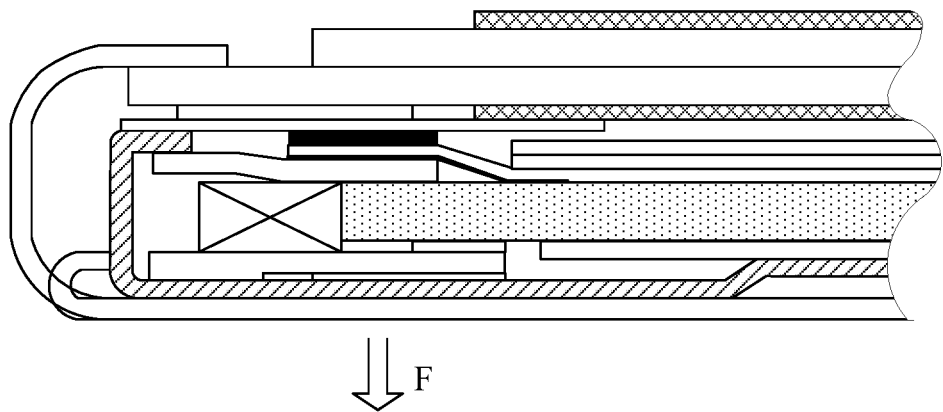
FIG. 4 is a force analysis diagram of the display device shown in FIG. 3.

In this case, referring to FIG. 4, FIG. 4 is a force analysis diagram of the display device shown in FIG. 3. In the case that the chip-on-flex 300 of the display device is bent, a bent portion of the chip-on-flex 300 has a certain rebound force. Under the action of the rebound force, a portion of the frame body 101 of the backlight module 100 bonded to the chip-on-flex 300 may be subject to a pulling force F from the chip-on-flex 300. Under the action of the pulling force F, the portion of the frame body 101 bonded to the chip-on-flex 300 may move along a direction of the pulling force F. At the same time, the light source 102 and a portion of the light guide plate 103 on the side proximal to the light source 102 in the frame body 101 may also follow the displacement of the frame body 101 to move along the direction of the pulling force F. The light absorber strip 105 usually needs to be bonded to the light-shielding strip (not marked in FIG. 3) between the liquid crystal display panel 200 and the frame body 101, so the light absorption strip 105 may move relative to the light guide plate 103 along a direction opposite to the pulling force F.

In the present disclosure, the light absorber strip 105 and the diffuser sheet 106 are not bonded, and the reflector strip 104 and the diffuser sheet 106 are bonded. Therefore, the diffuser sheet 106 may not follow the displacement of the light absorber strip 105 to move along a direction opposite to the pulling force F. Under the action of gravity, the diffuser sheet 106 and the reflector strip 104 may be follow a portion of the light guide plate 103 on a side proximal to the light source 102 to move along the direction of the pulling force F. In this way, it can be ensured that the light guide plate 103 and the diffuser sheet 106 may not be separated from each other, thereby ensuring that the light guide plate 103 is always in contact with the diffuser sheet 106, and effectively reducing a probability that a light emitted by the light source 102 of the backlight module 100 leaks from the space between the light guide plate 103 and the diffuser sheet 106. Therefore, a light emission effect of the backlight module 100 is improved, and a better display effect of the display device is ensured.

As shown in FIG. 1, the black adhesive strip 024 is disposed on a side, proximal to the light source 022, of the frame body 021. Therefore, part of the light emitted by the light source 022 may be absorbed by the black adhesive strip 024, resulting in a low light emission efficiency of the light source 022 of the backlight module 02.

Figure 5:
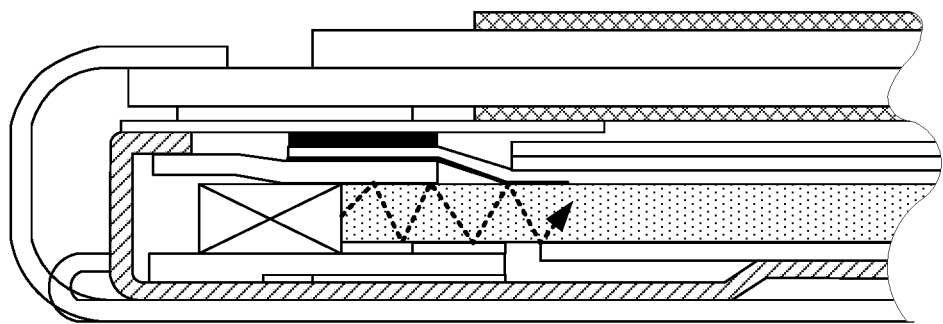
FIG. 5 is a light path diagram in a light guide plate of the display device shown in FIG. 3.

In the embodiments of the present disclosure, as shown in FIG. 5. FIG. 5 is a light path diagram in a light guide plate of the display device shown in FIG. 3. In the present disclosure, the reflector strip 104 of the backlight module 100 is proximal to the light source 102 relative to the light absorber strip 105. Therefore, the light emitted by the light source 102 may not be directly absorbed by the light absorber strip 105, but may be reflected multiple times by the reflector strip 104, so that the light emitted by the light source 102 is scattered, and then exits from a side, proximal to the liquid crystal display panel 200, of the light guide plate 103. Therefore, a probability that the light emitted by the light source 102 is directly absorbed by the light absorber strip 105 is effectively reduced, and a light emission efficiency of the light source 102 is increased, and the light emission effect of the backlight module 100 is further improved.

In summary, the display device provided by the embodiments of the present disclosure includes a backlight module, a liquid crystal display panel, and a chip-on-flex. The backlight module may include a frame body, and an edge-type light source, a light guide plate, a reflector strip, a light absorber strip, and an optical film disposed in the frame body. The light absorber strip and the diffuser sheet are not bonded, and the reflector strip and the diffuser sheet are bonded. Therefore, in the case that the chip-on-flex is bent and bonded to the side, distal from the liquid crystal display panel, of the backlight module, under the action of the rebound force from the bent portion of the chip-on-flex, the diffuser sheet may not follow the displacement of the light absorber strip to move, and may follow the displacement of the light guide plate 103 to move, with the reflector strip 104. In this way, it can be ensured that the light guide plate and the diffuser sheet may not be separated from each other, thereby ensuring that the light guide plate is always in contact with the diffuser sheet, and effectively reducing a probability that light emitted by the light source of the backlight module leaks from the space between the light guide plate and the diffuser sheet. Therefore, a light emission effect of the backlight module is improved. In addition, there is no need to redesign the internal structure of the display device, and only the reflector strip is newly introduced to the backlight module, thus the manufacturing cost of the display device can be effectively reduced. The reflector strip is proximal to the light source relative to the light absorber strip, therefore, the light emitted by the light source may not be directly absorbed by the light absorber strip, but may be reflected multiple times by the reflector strip, so that the light emitted by the light source is scattered, and then exits from a side, proximal to the liquid crystal display panel, of the light guide plate. Therefore, the probability that the light emitted by the light source is directly absorbed by the light absorber strip is effectively reduced, the light emission efficiency of the light source is increased, the light emission effect of the backlight module is further improved, and a better display effect of the display device is ensured.

Figure 6:
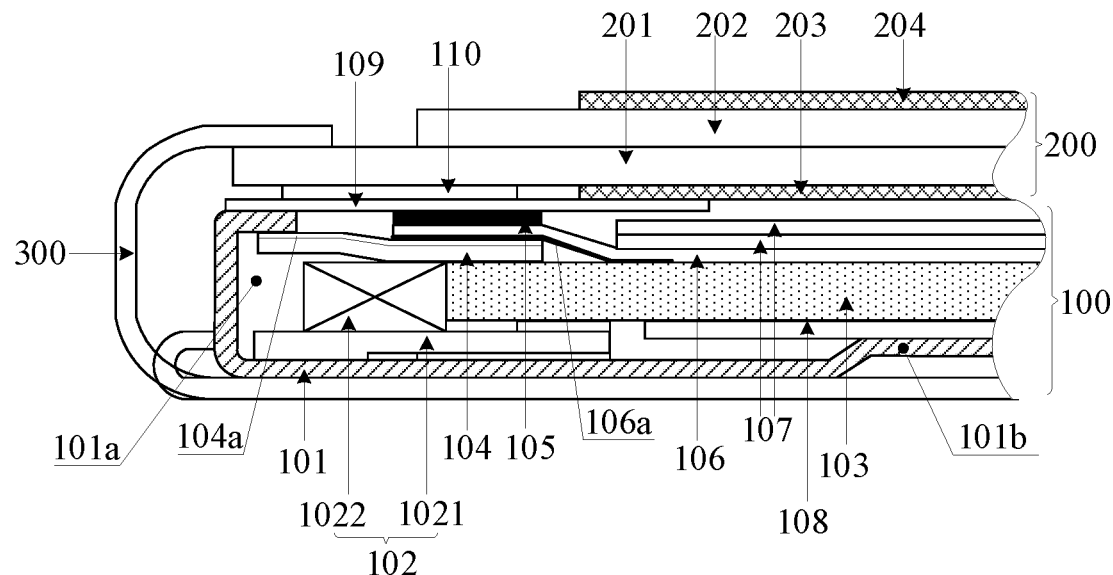
FIG. 6 is a schematic diagram of another film structure of a display device according to an embodiment of the present disclosure.

Referring to FIG. 6. FIG. 6 is a schematic diagram of another film structure of a display device provided according to an embodiment of the present disclosure. A side, proximal to the light source 102, of the frame body 101 of the frame body 100 is provided with a slot 101a. A surface, distal from the light guide plate 103, of the reflector strip 104 of the frame body 100 is connected to a side wall of the slot 101a. For example, a surface, distal from the light guide plate 103 and the side wall of the slot 101a, of the reflector strip 104 may be connected by bonding.

In this case, the surface, distal from the light guide plate 103, of the reflector strip 104 can not only be bonded to the diffuser sheet 106, but also can be bonded to the side wall of the slot 101a of the frame body 101. In this way, the diffuser sheet 106 can be prevented from moving along a direction parallel to the diffuser sheet 106, which effectively improves stability of the diffuser sheet 106 of the backlight module 100, and further improves the light emission effect of the backlight module 100.

In the embodiments of the present disclosure, a side, proximal to the light guide plate 103, of the reflector strip 104 of the backlight module 100 is arranged separately from the light guide plate 103. That is, the reflector strip 104 and the light guide plate 103 are not bonded, that is, there is no bonding adhesive arranged between the reflector strip 104 and the light guide plate 103. The bonding adhesive is prone to cause a light-gathering effect, which may damage a light path transmitting in the light guide plate 103, of the light emitted from the light source 102. Therefore, the light emission effect of the backlight module 100 can be further improved in the case that there is no bonding adhesive arranged between the reflector strip 104 and the light guide plate 103.

For this reason, in the above embodiment, a side, distal from the light guide plate 103, of the reflector strip 104, is only provided with an adhesive layer 104a, while a side, proximal to the light guide plate 103, of the reflector strip 104 is not provided with an adhesive layer. The adhesive layer 104a on the side, distal from the light guide plate 103, of the reflector strip 104 may be bonded to the diffuser sheet 106 of the optical film, and the adhesive layer 104a may also be bonded to the side wall of the slot 101a.

In a possible implementation, the adhesive layer 104a on the side, distal from the light guide plate 103, of the reflector strip 104 may be a single-sided adhesive tape. In this case, the reflector strip 104 may be a white adhesive strip with a single-sided adhesive tape. The white adhesive strip may be bonded to the diffuser sheet 106 by the single-sided adhesive tape, and the white adhesive strip may be bonded to the side wall of the slot 101a of the frame body 101 by the single-sided adhesive tape.

In another possible implementation, the adhesive layer 104a on the side, distal from the light guide plate 103, of the reflector strip 104 may also be a double-sided adhesive tape. In this case, the reflector strip 104 may be a strip-shaped metal reflection structure. The strip-shaped metal reflection structure may be bonded to one surface of the double-sided adhesive tape, and the other surface of the double-sided adhesive tape may be bonded to the diffuser sheet 106 and the side wall of the slot 101a of the frame body 101.

It should be noted that, in the case that the reflector strip 104 is a strip-shaped metal reflection structure, there is a need to coat an insulating film on the metal reflection structure to avoid a short circuit between the metal reflection structure and a conductive structure of the backlight module 100.

In the embodiments of the present disclosure, the optical film of the backlight module 100 may not only include the diffuser sheet 106, it may also include a two-layer light-enhancement sheet 107 disposed on a side, distal from the light guide plate 103, of the diffuser sheet 106. The two-layer light-enhancement sheet 107 needs to be laminated on the diffuser sheet 106.

In some embodiments, a side, proximal to the light source 102, of the diffuser sheet 106 of the backlight module 100 is provided with a strip-shaped light absorption structure 106a. The light absorption structure 106a of the diffuser sheet 106 may be in contact with the reflector strip 104 in the backlight module 100. In this way, in the case that the reflector strip 104 of the backlight module 100 is a white adhesive strip, most of lights emitted by the light source 102 can be reflected by the reflector strip 104, but a small amount of the lights may be transmitted through the reflector strip 104. The transmitted lights can be absorbed by the light absorption structure 106a of the diffuser sheet 106, thus the light leakage of the light source 102 may be effectively avoided.

For example, the light absorption structure 106a of the diffuser sheet 106 can be silk-screened black oil. In this case, the silk-screened black oil on a side, proximal to the light source 102, of the diffuser sheet 106 may be printed by using a screen printing process, so as to form the light absorption structure 106a in the diffuser sheet 106.

In the embodiments of the present disclosure, the light absorption structure 106a of the diffuser sheet 106 and the reflector strip 104 of the backlight module 100 are both strip-shaped, and a width direction of the strip-shaped light absorption structure 106a is parallel to a width direction of the reflector strip 104. The width of the strip-shaped light absorption structure 106a may be greater than a width of a contact area between the diffuser sheet 106 and the reflector strip 104.

In this case, the strip-shaped light absorption structure 106a of the diffuser sheet 106 can not only be in contact with the reflector strip 104, but also be in contact with the light guide plate 103. In this way, the strip-shaped light absorption structure 106a of the diffuser sheet 106 can not only absorb the lights transmitted from the reflector strip 104, but also absorb the lights transmitted from an area of the light guide plate 103 that is not in contact with the diffuser sheet 106 and the reflector strip 104.

In the present disclosure, as shown in FIG. 6, the frame body 101 of the backlight module 100 of the display device is not only provided with a slot 101a, but also provided with a back plate 101b. The light guide plate 103 of the backlight module 100 can be effectively supported by the back plate 101b. The backlight module 100 of the display device may further include a reflector sheet 108 disposed between the light guide plate 103 and the back plate 101b. That is, the reflector sheet 108 is disposed on the side, distal from the diffuser sheet 106, of the light guide plate 103. The light transmitted from the light guide plate 103 can be reflected out of the light guide plate 103 from the side, proximal to the diffuser sheet 106, of the light guide plate 103 by the reflector sheet 108.

In the embodiments of the present disclosure, as shown in FIG. 6, the light source 102 of the backlight module 100 may include a flexible circuit board 1021 and a plurality of lamp bodies 1022 disposed on the flexible circuit board 1021. In the present disclosure, each of the plurality of lamp bodies 1022 may be a light emitting diode (LED). A light emitting surface of each of the plurality of lamp bodies of the light source 102 may be connected to a side surface of the light guide plate 103. The flexible circuit board 1021 in the light source 102 may be connected to a side, distal from the diffuser sheet 106, of the light guide plate 103. In this way, the light emitting surface of each of the plurality of lamp bodies 1022 and the side surface of the light guide plate 103 may be connected by bonding, and the flexible circuit board 1021 and the side, distal from the diffuser sheet 106, of the light guide plate 103 may also be connected by bonding.

It should be noted that, flexible circuit boards in the light sources of the current common backlight modules are all bonded to the front surfaces (that is, the light emitting surfaces of the light guide plates) of the light guide plates. Therefore, an area for bonding the flexible circuit board needs to be reserved on the front surface of the light guide plate, and this area needs to be blocked by the frame of the display device, resulting in a larger width of the frame of the display device. In the embodiments of the present disclosure, in the case that the flexible circuit board 1021 is bonded to the side, distal from the diffuser sheet 106, of the light guide plate 103, there is no need to reserve an area for bonding the flexible circuit board 1021 on the front surface of the light guide plate 103, and thus the width of the frame of the display device can be further reduced, thereby the screen-to-body ratio of the display device can be further improved.

In some embodiments, as shown in FIG. 6, the backlight module 100 of the display device may further include a light-shielding adhesive 109 disposed between the frame body 101 and the liquid crystal display panel 200. The light-shielding adhesive 109 may be a double-sided adhesive tape, in this case, one surface of the light-shielding adhesive 109 may be bonded to the liquid crystal display panel 200, and the other surface of the light-shielding adhesive 109 may be bonded to the light absorber strip 105. For example, the light absorber strip 105 may be a black adhesive strip without tape. In this way, in the case that the black adhesive strip is bonded to the light-shielding adhesive 109, the emitted lights without passing through a two-layer prism sheet 107 of the backlight module 100 can be absorbed by the black adhesive strip. Therefore, it can be ensured that the light emitted from the backlight module 100 can pass through the light guide plate 103, the diffuser sheet 106, and the two-layer prism sheet 107 in sequence.

In the present disclosure, the surface, distal from the liquid crystal display panel 200, of the light-shielding adhesive 109 may further be bonded to an end surface, proximal to the liquid crystal display panel 200, of the frame body 101. In this way, a connection between the backlight module 100 and the liquid crystal display panel 200 can be realized by the light-shielding adhesive 109.

In the embodiments of the present disclosure, the liquid crystal display panel 200 of the display device usually includes an array substrate 201 and a color filter substrate 202 arranged oppositely from each other, a first polarizer 203 disposed on a side, distal from the color filter substrate 202, of the array substrate 201 (that is, a light incident side of the liquid crystal display panel 200), and a second polarizer 204 disposed on a side, distal from the array substrate 201, of the color filter substrate 202 (that is, the light emitting side of the liquid crystal display panel 200). It should be noted that the liquid crystal display panel 200 may further include a liquid crystal layer (not shown in FIG. 6) disposed between the array substrate 201 and the color filter substrate 202. A surface, proximal to the liquid crystal display panel 200, of the light-shielding adhesive 109 may be bonded to the first polarizer 203 of the liquid crystal display panel 200.

In this case, an area of the first polarizer 203 disposed at the light incident side of the liquid crystal display panel 200 is small (usually slightly larger than an area of a display area of the display device), and the first polarizer 203 is bonded to the light-shielding adhesive 109 of the backlight module 100. Therefore, in order to improve robustness of the connection between the backlight module 100 and the liquid crystal display panel 200, the backlight module may include a buffer foam 110 disposed between the light-shielding adhesive 109 and the liquid crystal display panel 200, and a surface, proximal to the array substrate 201, of the buffer foam 110 is provided with a double-sided adhesive tape. One surface of the buffer foam 110 is bonded to the light-shielding adhesive 109, and the other surface of the buffer foam 110 is bonded to the array substrate 201 by the double-sided adhesive tape. The bonding area between the light-shielding adhesive 109 and the liquid crystal display panel 200 may be increased by the buffer foam 110, thereby improving the robustness of the bonding between the liquid crystal display panel 200 and the backlight module 100.

In summary, the display device provided according to the embodiments of the present disclosure includes a backlight module, a liquid crystal display panel, and a chip-on-flex. The backlight module may include a frame body, and an edge-type light source, a light guide plate, a reflector strip, a light absorber strip, and an optical film disposed in the frame body. The light absorber strip and the diffuser sheet of the optical film are not bonded, and the reflector strip and the diffuser sheet of the optical film are bonded. Therefore, in the case that the chip-on-flex is bent and bonded to the side, distal from the liquid crystal display panel, of the frame body of the backlight module, under the action of the rebound force from the bent portion of the chip-on-flex, the diffuser sheet may not follow the displacement of the light absorber strip to move, and the diffuser sheet 106 may follow the displacement of the light guide plate 103 to move, with the reflector strip 104. In this way, it can be ensured that the light guide plate and the diffuser sheet may not be separated from each other, thereby ensuring that the light guide plate is always in contact with the diffuser sheet, and effectively reducing a probability that light emitted by the light source of the backlight module leaks from space between the light guide plate and the diffuser sheet, thus a light emission effect of the backlight module is improved. Moreover, the internal structure of the display device does not need to be redesigned, and only the reflector strip is newly introduced to the backlight module, thus the manufacturing cost of the display device may be effectively reduced. In addition, the reflector strip is proximal to the light source relative to the light absorber strip. Therefore, the light emitted by the light source may not be directly absorbed by the light absorber strip, but may be reflected multiple times by the reflector strip, so that the light emitted by the light source is scattered, and then exits from a side, proximal to the liquid crystal display panel, of the light guide plate. Therefore, the probability that the light emitted by the light source is directly absorbed by the light absorber strip is effectively reduced, the light emitting efficiency of the light source is increased, the light emission effect of the backlight module is further improved, and a better display effect of the display device is ensured.

Figure 7:
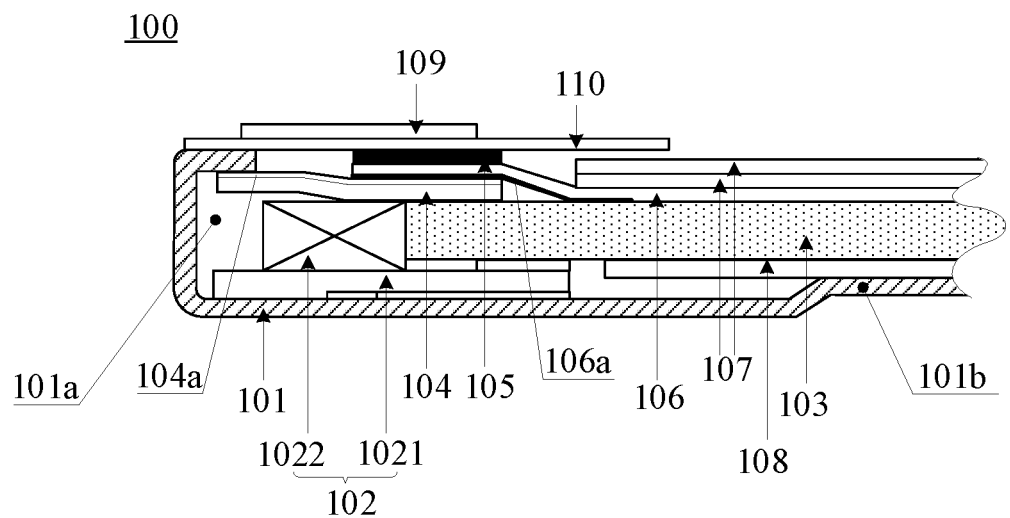
FIG. 7 is a schematic diagram of a film structure of a backlight module according to an embodiment of the present disclosure.

The embodiments of the present disclosure further provide a backlight module, which may be the backlight module 100 of the display device in the above-mentioned embodiment. Referring to FIG. 7. FIG. 7 is a schematic diagram of a film structure of a backlight module according to an embodiment of the present disclosure. The backlight module 100 may include: a frame body 101, and an edge-type light source 102, a light guide plate 103, a reflector strip 104, a light absorber strip 105, and an optical film disposed in the frame body 101.

A light emitting surface of the light source 102 may face a side surface of the light guide plate 103. The optical film is disposed on the light guide plate 103. For example, the optical film may include a diffuser sheet 106 disposed on the light guide plate 103, and the diffuser sheet 106 may be in contact with the light guide plate 103.

The reflector strip 104 may be disposed on a side, proximal to the light source 102, of the frame body 101, and the reflector strip 104 may be disposed between the diffuser sheet 106 and the light guide plate 103. The reflector strip 104 and the diffuser sheet 106 may be bonded together.

The light absorber strip 105 may be disposed on a side, proximal to the light source 102, of the frame body 101, and the light absorber strip 105 may be disposed on a side, distal from the reflector strip 104, of the diffuser sheet 106. The light absorber strip 105 is arranged separately from the diffuser sheet 106. That is, the light absorber strip 105 and the diffuser sheet 106 are not bonded.

In some embodiments, a surface, proximal to the light guide plate 103, of the reflector strip 103 is arranged separately from the light guide plate 103.

In some embodiments, a side, proximal to the light source 102, of the frame body 101 is provided with a slot 101a, and a surface, distal from the light guide plate 103, of the reflector strip 103 may be bonded to a side wall of the slot 101a.

In some embodiments, the frame body 101 is further provided with a back plate 101b, and the light guide plate 103 of the backlight module 100 can be effectively supported by the back plate 101b.

In some embodiments, the reflector strip 104 may be a white adhesive strip with an adhesive layer 104a, and the adhesive layer 104a is disposed on a surface, distal from the light guide plate 103, of the white adhesive strip, and bonded to the diffuser sheet 106.

In some embodiments, the backlight module 100 may further include a two-layer light-enhancement sheet 107 disposed on a side, distal from the light guide plate 103, of the diffuser sheet.

In some embodiments, a side, proximal to the light source 102, of the diffuser sheet is provided with a strip-shaped light absorption structure 106a.

In some embodiments, a width of the light absorption structure 106a is greater than a width of a contact area between the diffuser sheet and the reflector strip 104.

In some embodiments, the light absorption structure 106a may be silk-screened black oil.

In some embodiments, the backlight module 100 may further include a reflector sheet 108 disposed on a side, distal from the diffuser sheet 106, of the light guide plate 103.

In some embodiments, the backlight module 100 may further include a light-shielding adhesive 109 disposed on a side, distal from the light guide plate 103, of the frame body, and one surface of the light-shielding adhesive 109 is configured to be bonded to the liquid crystal display panel, and the other surface of the light-shielding adhesive 109 is configured to be bonded to the light absorber strip 105.

In some embodiments, the backlight module 100 may further include a buffer foam 110 disposed on a side, distal from the frame body 101, of the light-shielding adhesive 109, and the light-shielding adhesive 109 is configured to be bonded to the liquid crystal display panel by the buffer foam 110.

In some embodiments, the light source 102 includes a flexible circuit board 1021, and a plurality of lamp bodies 1022 disposed on the flexible circuit board 1021. A light emitting surface of the plurality of lamp bodies 1022 is bonded to a side surface of the light guide plate 103, and the flexible circuit board 1022 is bonded to a side, distal from the diffuser sheet 106, of the light guide plate 103.

It should be clearly understood by those skilled in the art that, for the convenience and conciseness of the description, the working principles and connection relationships of various structures of the backlight module described above can be referred to the corresponding content in the embodiments of the structure of the display device, and which may not be repeated herein.

It should be noted that, the dimension of the layers and regions in the accompanying drawings may be exaggerated for clarity of illustration. It should be understood that when an element or layer is described as being "above" another element or layer, the described element or layer may be directly on the other element or layer, or there may be an intermediate layer arranged between the described element or layer and the other elements or layers. In addition, it should be understood that when an element or layer is described as being "below" another element or layer, the described element or layer may be directly below the other element or layer, or there may be more than one intermediate layer or element arranged between the described element or layer and the other elements or layers. In addition, it should also be understood that when a layer or element is described as being "between" two layers or elements, the described layer or element may be the only layer between the two layers or elements, or there may be more than one intermediate layer or element arranged between the two layers or elements. The similar reference numerals denote similar elements in the whole description described above.

In the present disclosure, the terms "first" and "second" are used for descriptive purposes only and are not to be construed as indicating or implying relative importance. The term "plurality" refers to two or more, unless specifically defined otherwise.

The above embodiments are only alternative examples of the present disclosure, and are not intended to limit the present disclosure. Any modification, equivalent replacement, and improvement made within the spirit and principle of the present disclosure shall be included within the protection scope of the present disclosure.

What is claimed is:

1. A display device, comprising a chip-on-flex, a liquid crystal display panel and a backlight module; wherein
   the chip-on-flex is electrically connected to the liquid crystal display panel, and connected to a side, distal from the liquid crystal display panel, of the backlight module; and
   the backlight module comprises a frame body, and an edge-type light source, a light guide plate, a reflector strip, a light absorber strip, and an optical film disposed in the frame body; wherein
   a light emitting surface of the light source faces a side surface of the light guide plate, and the optical film is disposed on the light guide plate;
   the reflector strip is disposed on a side, proximal to the light source, of the frame body, between the optical film and the light guide plate, and connected to the optical film;
   the light absorber strip is disposed on a side, proximal to the light source, of the frame body, and on a side, distal from the reflector strip, of the optical film, and is arranged separately from the optical film;
   wherein an inner side, proximal to the light source, of the frame body is provided with a slot, and a surface, distal from the light guide plate, of the reflector strip is connected to a side wall of the slot;
   wherein a surface, distal from the light guide plate, of the reflector strip is provided with an adhesive layer, and the adhesive layer is bonded to the optical film and the side wall of the slot.

2. The display device according to claim 1, wherein a surface, proximal to the light guide plate, of the reflector strip is arranged separately from the light guide plate.

3. The display device according to claim 1, wherein the adhesive layer is a single-sided adhesive tape, and the reflector strip is a white adhesive strip with the single-sided adhesive tape.

4. The display device according to claim 1, wherein the adhesive layer is a double-sided adhesive tape, the reflector strip is a strip-shaped metal reflection structure, and the metal reflection structure is bonded to one surface of the double-sided adhesive tape.

5. The display device according to claim 1, wherein the frame body further is provided with a back plate configured to support the light guide plate.

6. The display device according to claim 5, wherein the backlight module further comprises a reflector sheet disposed between the light guide plate and the back plate.

7. The display device according to claim 1, wherein the optical film comprises a diffusion sheet disposed on the light guide plate, the reflector strip is disposed between the diffuser sheet and the light guide plate, and the optical film further comprises a two-layer light-enhancement sheet disposed on a side, distal from the light guide plate, of the diffuser sheet.

8. The display device according to claim 7, wherein a side, proximal to the light source, of the diffuser sheet is provided with a strip-shaped light absorption structure, the light absorption structure being in contact with the reflector strip.

9. The display device according to claim 8, wherein a width of the light absorption structure is greater than a width of a contact area between the diffuser sheet and the reflector strip.

10. The display device according to claim 9, wherein the light absorption structure is further in contact with the light guide plate.

11. The display device according to claim 8, wherein the light absorption structure is silk-screened black oil.

12. The display device according to claim 7, wherein the backlight module further comprises a light-shielding adhesive disposed between the frame body and the liquid crystal display panel, one surface of the light-shielding adhesive is bonded to the liquid crystal display panel, and the other surface of the light-shielding adhesive is bonded to the light absorber strip.

13. The display device according to claim 12, wherein a surface, distal from the liquid crystal display panel, of the light-shielding adhesive is further bonded to an end surface, proximal to the liquid crystal display panel, of the frame body.

14. The display device according to claim 12, wherein the light absorber strip is a black adhesive strip.

15. The display device according to claim 12, wherein the liquid crystal display panel comprises an array substrate and a color filter substrate arranged opposite to each other, a first polarizer disposed on a side, distal from the color filter substrate, of the array substrate, and a second polarizer disposed on a side, distal from the array substrate, of the color filter substrate; a surface, proximal to the liquid crystal display panel, of the light-shielding adhesive is bonded to the first polarizer.

16. The display device according to claim 15, wherein the backlight module further comprises a buffer foam disposed between the light-shielding adhesive and the array substrate, and a surface, proximal to the array substrate, of the buffer foam is provided with a double-sided adhesive tape; one surface of the buffer foam is bonded to the light-shielding adhesive, and the other surface of the buffer foam is bonded to the array substrate by the double-sided adhesive tape.

17. The display device according to claim 7, wherein the light source comprises a flexible circuit board, and a plurality of lamp bodies disposed on the flexible circuit board, a light emitting surface of each of the plurality of lamp bodies is connected to a side surface of the light guide plate, and the flexible circuit board is connected to a side, distal from the optical film, of the light guide plate.

18. A backlight module, comprising a frame body, and an edge-type light source, a light guide plate, a reflector strip, a light absorber strip, and an optical film disposed in the frame body; wherein
 a light emitting surface of the light source faces a side surface of the light guide plate, and the optical film is disposed on the light guide plate;
 the reflector strip is disposed on a side, proximal to the light source, of the frame body, between the optical film and the light guide plate, and is connected to the optical film;
 the light absorber strip is disposed on a side, proximal to the light source, of the frame body, and is disposed on a side, distal from the reflector strip, of the optical film, and is arranged separately from the optical film;
 wherein an inner side, proximal to the light source, of the frame body is provided with a slot, and a surface, distal from the light guide plate, of the reflector strip is connected to a side wall of the slot;
 wherein a surface, distal from the light guide plate, of the reflector strip is provided with an adhesive layer, and the adhesive layer is bonded to the optical film and the side wall of the slot.

* * * * *